United States Patent [19]

Suzuki et al.

[11] Patent Number: 4,677,161

[45] Date of Patent: Jun. 30, 1987

[54] CURABLE ORGANOSILOXANE COMPOSITIONS

[75] Inventors: Toshio Suzuki; Akihiko Shirahata; Naohiro Muramoto, all of Chiba, Japan

[73] Assignee: Toray Silicone Co., Ltd., Tokyo, Japan

[21] Appl. No.: 861,881

[22] Filed: May 12, 1986

[30] Foreign Application Priority Data

May 16, 1986 [JP] Japan .................... 60-104803

[51] Int. Cl.$^4$ ............................................ C08L 83/04
[52] U.S. Cl. ................................. 524/862; 524/861; 524/731; 528/15; 528/31; 528/32; 525/478
[58] Field of Search .................. 528/15, 31, 32; 524/861, 862, 731; 525/478

[56] References Cited

U.S. PATENT DOCUMENTS

| | | | |
|---|---|---|---|
| 3,699,072 | 10/1972 | Clark et al. ................... | 260/37 SB |
| 3,892,707 | 7/1975 | Itoh et al. ..................... | 260/37 SB |
| 4,082,726 | 4/1978 | Mine et al. ................... | 260/46.5 UA |
| 4,196,273 | 4/1980 | Imai et al. ..................... | 528/15 |
| 4,329,273 | 5/1982 | Hardman et al. .............. | 524/862 |
| 4,332,844 | 6/1982 | Hamada et al. ............... | 427/387 |
| 4,535,141 | 8/1985 | Kroupa ......................... | 528/31 |

FOREIGN PATENT DOCUMENTS

| | | |
|---|---|---|
| 28309 | 3/1975 | Japan . |
| 58755 | 5/1979 | Japan . |
| 58756 | 5/1979 | Japan . |
| 39258 | 10/1980 | Japan . |
| 5836 | 2/1982 | Japan . |

*Primary Examiner*—Melvyn I. Marquis
*Attorney, Agent, or Firm*—Robert Spector

[57] ABSTRACT

This invention provides self-adhering polyorganosiloxane compositions that cure by a platinum-catalyzed hydrosilation reaction. The compositions include as the adhesion promoter a polysiloxane comprising diorganohydrogensiloxy, alkoxy and $SiO_{4/2}$ units.

11 Claims, No Drawings

CURABLE ORGANOSILOXANE COMPOSITIONS

BACKGROUND OF THE INVENTION

1. Field of the Invention

This invention relates to curable organosiloxan compositions. More particularly, this invention relates to curable organosiloxane compositions capable of cohesively bonding to substrates with which they are in contact during curing.

2. Description of the Prior Art

Many methods have been proposed for imparting adhesion to organosiloxane compositions that cure by the addition reaction of lower alkenyl radicals with silicon-bonded hydrogen atoms in the presence of a platinum catalyst. Some of these methods involve addition of various types of adhesion promoters to the compositions. The addition of a silane containing both alkenyl radicals and silicon-bonded alkoxy groups or a partial hydrolysis product of the silane is taught in U.S. Pat. No. 4,196,273, which issued to Imai and Tanaka on Apr. 1, 1980, U.S. Pat. No. 4,329,273, which issued to Hardman et al. on May 11, 1982, and in Japanese Patent Publication No. 76/28309. The use as adhesion promoters of silanes containing both silicon-bonded hydrogen atoms and silicon-bonded alkoxy groups and partial hydrolysis products of these silanes is described in Japanese Patent Publication No. 82/5836. The addition of polyorganosiloxane compositions of adhesion promoters consisting of an alkoxy-containing silicon compound, an organotitanate and an organohydrogensilicon compound is disclosed in U.S. Pat. No. 4,332,844, which issued to Hamada et al. on June 1, 1982. Curable compositions wherein the adhesion promoter is a linear or cyclic polyorganosiloxane wherein each molecule contains substituents selected from lower alkenyl, silicon-bonded hydrogen, silicon-bonded alkoxy, epoxy and ester are described in U.S. Pat. No. 3,669,072, which issued to Clark and Hayes on Oct. 17, 1972, U.S. Pat. No. 4,082,726, which issued to Mine et al. on Apr. 4, 1978, Japanese patent publication No. 80/39258, and Japanese published application (Kokai) Nos. 54/58755 and 54/58756. The use of a lower enoxysilane or a partial hydrolyzate thereof as an adhesion promoter is disclosed in U.S. Pat. No. 3,892,707, which issued to Itoh and Harada on July 1, 1975.

Each of the aforementioned prior art adhesion promoters had disadvantages associated with its use. The presence of both a lower alkenyl radical and an alkoxy group in a single silane interferes with the addition reaction and slows the cure rate. Siloxanes containing epoxy or ester groups are not completely miscible with the principal siloxane ingredient, and the composition becomes cloudy following the addition. Trimethoxysilane is an extremely toxic material. The synthesis of lower enoxysilanes is both costly and time consuming, and the silanes tend to be scattered during reduced pressure degassing of the polyorganosiloxane composition.

The present inventors examined various methods to overcome the problems associated with prior art adhesion promoters. An objective of this invention is to provide a polyorganosiloxane composition free of cloudiness wherein curing is not hindered by the presence of an adhesion promoter, adhesion is not reduced by degassing of the composition, and wherein the composition exhibits excellent adhesion to substrates with which it is in contact as it cures.

SUMMARY OF THE INVENTION

The foregoing objective is realized by providing a self-adhering polyorganosiloxane composition curable by a platinum-catalyzed hydrosilation reaction. The composition includes as the adhesion promoter a polysiloxane comprising diorganohydrogensiloxy, alkoxy and $SiO_{4/2}$ units.

DETAILED DESCRIPTION OF THE INVENTION

This invention provides a curable organosiloxane composition comprising (a) a polyorganosiloxane having an average unit formula $R_aSiO_{(4-a)/2}$, where R represents a monovalent hydrocarbon radical, with the proviso that at least two of the R radicals in each molecule are lower alkenyl, and the value of a is from 0.8 to 2.2, inclusive;

(b) a polyorganohydrogensiloxane containing at least 2 silicon-bonded hydrogen atoms per molecule and which is substantially free of silicon-bonded alkoxy groups and alkenyl radicals, the quantity of polyorganohydrogensiloxane being sufficient to provide a molar ratio of silicon-bonded hydrogen atoms in ingredients (b) and (d) to the moles of alkenyl radicals in ingredient (a) of from 0.5:1 to 3.0:1, respectively;

(c) a platinum containing hydrosilation catalyst in an amount equivalent to from 0.1 to 100 ppm by weight of platinum, based on the combined weight of ingredients (a), (b) and (c);

(d) from about 1 to 20%, based on the weight of ingredient (a), of a polysiloxane represented by the general formula $(HR'_2SiO_{\frac{1}{2}})_b(R''O_{\frac{1}{2}})_c(SiO_{4/2})_d$ where R' and R'' represent monovalent hydrocarbon radicals containing from 1 to 3 carbon atoms, the value of b/c in said general formula is from 0.2 to 2, inclusive, the value of (b+c)/d in said general formula is from 0.4 to 4, inclusive, and d represents a number greater than 0 and less than 30.

The polyorganosiloxane identified as ingredient (a) is the principal ingredient of the present compositions. It reacts with the polyorganohydrogensiloxane ingredient (b) under the catalytic activity of ingredient (c) to form a crosslinked product.

Examples of the lower alkenyl radicals present in ingredient (a) are vinyl, allyl and propenyl. The lower alkenyl radicals can be present at any location along the molecule, but are preferably present at least at the terminal positions of the molecule. The monovalent organic radicals are exemplified by alkyl radicals such as methyl, ethyl, propyl and butyl; aryl radicals such as phenyl and tolyl; benzyl; halogenated alkyl radicals such as chloropropyl and trifluoropropyl; and the alkenyl radicals mentioned above. In addition to the hydrocarbon radicals represented by R, small quantities of alkoxy and/or hydroxyl groups may also be present. At least 70 mole % of the R radicals are preferably methyl to obtain good adhesion. The average value of a in the formula for ingredient (a) is from 0.8 to 2.2. To achieve excellent adhesion this value is preferably from 1.95 to 2.05.

The molecular configuration of ingredient (a) can be straight chain, branch-containing straight chain, cyclic, network or three dimensional. A straight chain, optionally with at most a small amount of branching, is preferred. The molecular weight of this component is not critical and the consistency can range from that of a watery liquid to that of a gum. To achieve good mixing and workability, a viscosity of from 0.05 to 100 Pa.s at 25° C. is preferred.

Specific examples of ingredient (a) include, but are not limited to, polyvinylsiloxanes, vinylsiloxane-methylsiloxane copolymers, dimethylvinylsiloxy-terminated polydimethylsiloxanes, dimethylvinylsiloxy-terminated dimethylsiloxane-methylphenylsiloxane copolymers, dimethylvinylsiloxy-terminated dimethylsiloxane-methylvinylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methyl(trifluoropropyl)siloxane copolymers.

Ingredient (b) is the crosslinking agent for ingredient (a) and it reacts via addition with the lower alkenyl radicals of ingredient (a) under the catalytic activity of ingredient (c) to cure the composition. The molecular configuration of ingredient (b) is not critical to this invention, and it may be straight chain, branch-containing straight chain or cyclic. The molecular weight of this ingredient is also not critical, however the viscosity is preferably from 0.001 to 50 Pa.s at 25° C. to obtain an excellent miscibility of this ingredient with ingredient (a). Ingredient (b) is added at a quantity such that the molar ratio of the total quantity of silicon-bonded hydrogen atoms in this ingredient and in ingredient (d) relative to the total quantity of alkenyl radicals in ingredient (a) is from 0.5:1 to 30:1. When this molar ratio is less than 0.5:1, the resulting composition will not cure properly. When this molar ratio exceeds 3.0:1, the resulting composition has poor adhesion. When an additional alkenyl-containing siloxane is to be added for reinforcement or some other purpose, the amount of ingredient (b) is increased to compensate for the additional number of alkenyl radicals.

Specific examples of ingredient (b) include: trimethylsiloxy-terminated polymethylhydrogensiloxanes, trimethylsiloxy-terminated dimethylsiloxane-methylhydrogensiloxane copolymers, dimethylhydrogensiloxy-terminated polymethylhydrogensiloxanes, dimethylhydrogensiloxy-terminated dimethylsiloxane-methylhydrogensiloxane copolymers, dimethylsiloxane-methylhydrogensiloxane cyclic copolymers, copolymers containing $(CH_3)_2HSiO_{\frac{1}{2}}$ and $SiO_{\frac{1}{2}}$ units and copolymers containing $(CH_3)_3SiO_{\frac{1}{2}}$, $(CH_3)_2HSiO_{\frac{1}{2}}$ and $SiO_{4/2}$ units.

Ingredient (c) is a catalyst for the addition reaction of silicon-bonded hydrogen atoms and alkenyl radicals. Specific examples of this ingredient are chloroplatinic acid, its solutions in an alcohol or ketone and these solutions after aging, chloroplatinic acid-olefin complexes, chloroplatinic acid-alkenylsiloxane complexes, platinum-diketone complexes, platinum black, and platinum supported on a carrier.

Ingredient (c) is present at a concentration equivalent to from 0.1 to 100 parts per million of platinum based on the combined weight of ingredients (a), (b) and (c). When this quantity is less than 0.1 ppm, the crosslinking reaction will not proceed adequately. Using more than 100 ppm of platinum is uneconomical and significantly reduces the working time at room temperature. To achieve a desirable balance between catalyst activity and working time, the concentration of ingredient (c) is preferably equivalent to from 1 to 20 parts per million of platinum.

Ingredient (d) is the characterizing feature of the present compositions. It is responsible for the excellent adhesion to substrates in contact with these compositions during curing. Ingredient (d) is a three dimensional polysiloxane wherein the basic structural unit is $SiO_{4/2}$. The $HR'_2Si$ group and the $R''$ radicals shown in the formula for this ingredient are bonded to oxygen atoms of $SiO_{4/2}$ units. The relative concentrations of the units constituting ingredient (d) can be represented by the average molecular formula $(HR'_2SiO_{\frac{1}{2}})_b(R''O)_c(SiO_{4/2})_d$ where $R'$ and $R''$ represent monovalent hydrocarbon radicals containing from 1 to 3 carbon atoms, $b/c$ is from 0.2 to 2, inclusive, $(b+c)/d$ is from 0.4 to 4, inclusive, and d represents a number greater than 0 but less than 30. When the value of d is 30 or more, the molecular weight of the polysiloxane is so high that the desired adhesion cannot be achieved. The value of the upper limit for d is preferably 20 or less to achieve miscibility of this ingredient with the remainder of the present composition, and the lower limit for d is preferably at least 3 to prevent or at least minimize volatilization of this ingredient during degassing of the final composition of this invention.

If the value of $b/c$ in the formula for ingredient (d) is outside of the specified range, or when the value for $(b+c)/d$ is less than 0.4, good adhesion of the composition to the substrate is not achieved. Compositions wherein the value of $(b+c)/d$ is greater than 4 essentially cannot be produced. The radicals represented by $R'$ and $R''$ can be methyl, ethyl or propyl. $R'$ is preferably methyl and $R''$ is preferably methyl or ethyl.

The concentration of ingredient (d) in the compositions of this invention is from 1 to 20 weight percent, based on the weight of ingredient (a).

The original properties of the composition will be adversely affected when this level is exceeded. The optimal concentration of ingredient (d) for obtaining good adhesion depends on the structure of the other components, but it is generally from 1 to 8 parts by weight per 100 parts by weight of ingredient (a).

Ingredient (d) can be synthesized by methods known in the art. For example, an organosilicon reactant consisting essentially of at least one compound selected from dimethylhydrogenchlorosilane, dimethylhydrogenacetoxysilane, dimethylhydrogenethoxysilane and tetramethyldisiloxane can be cohydrolyzed with methyl orthosilicate or ethyl orthosilicate in the presence of a strictly controlled quantity of water. The use of an acid catalyst such as hydrochloric acid is recommended. One or both of the organosilicon reactant and the orthosilicate can be mixtures of 2 or more species. In a preferred embodiment the organosilicon reactant is added dropwise to an aqueous solution of the alkyl orthosilicate.

The curable organosiloxane compositions of the present invention can be prepared by simply blending ingredients (a), (b), (c) and (d) with each other. The mixer used in this operation is appropriately selected from mixing devices suitable for mixing liquids and gums. Suitable mixing devices include planetary mixers, screw mixers, static mixers and kneader mixers.

It is recommended that an additive selected from acetylene compounds, alkenyl group-containing compounds, hydrazines, triazoles, phosphines and mercaptans be added to the present curable compositions in order to inhibit the curing reaction at room temperature. In addition, fillers such as finely divided silica and carbon black, thermal stabilizers, colorants and flame retardants are added as desired unless they adversely affect the goal of the present invention. In order to increase the strength of the cured product, ingredient (a) of the present compositions includes a polyorganosiloxane composed of $CH_2=CH(CH_3)_2SiO_{\frac{1}{2}}$, $(CH_3)_3SiO_{\frac{1}{2}}$ and $SiO_{4/2}$ units in addition to the polyorganosiloxane described hereinbefore in connection with ingredient (a).

plying sufficient force to peel the rubber away from the glass. The results are reported in Table 1. In the table, the numerical value for adhesion is the % cohesive failure exhibited by the cured product. This value is determined by estimating that portion of the bond area over which cohesive failure has occurred. The curing time is defined as the period of heating required to completely cure the composition.

TABLE 1

| | Experiment No. | | | | |
|---|---|---|---|---|---|
| | 1 comparison example parts | 2 present invention parts | 3 present invention parts | 4 present invention parts | 5 comparison example parts |
| Ingredients | | | | | |
| polymer A1 | 100 | 100 | 100 | 100 | 100 |
| polymer X1 | 1.8 | 1.8 | 1.8 | 1.8 | 1.8 |
| catalyst 1 | 0.1 | 0.1 | 0.1 | 0.1 | 0.1 |
| additive I1 | 0.01 | 0.01 | 0.01 | 0.01 | 0.01 |
| polymer M1 | — | 2 | 4 | 6 | — |
| vinyltrimethoxysilane | — | — | — | — | 4 |
| curing time (150° C., minutes) | 3 | 3 | 2.5 | 2.5 | 5 |
| adhesion (%) | 0 | 80 | 100 | 100 | 100 |

As a result of using the present adhesion promoters, identified hereinbefore as ingredient (d), the curing reaction is not hindered, the composition does not become cloudy or suffer from a decrease in adhesion due to degassing and the composition has good adhesion to substrates with which it is in contact during curing. The present compositions are appropriately used as adhesive or coating agents for various substrates such as glass, ceramics, metals, resins, textiles and paper in numerous industries such as the electric/electronic industry, instrument industry, auto industry, machine industry, civil engineering and construction industry, container and packaging industry and medical supply industry. In addition, the excellent optical transparency of the cured compositions make them most appropriate for use as an adhesive in optical application.

The following examples disclose preferred embodiments of the present composition and should not be interpreted as limiting the invention defined in the accompanying claims. All parts and percentages in the examples are by weight. Viscosity and other properties are measured at 25° C.

EXAMPLE 1

A series of compositions was prepared from a dimethylvinylsiloxy-terminated polydimethylsiloxane with a viscosity of 2 Pa.s (polymer A1), a trimethylsiloxy-terminated copolymer containing dimethylsiloxane and methylhydrogensiloxane units in a 3:5 molar ratio and exhibiting a viscosity of 0.01 Pa.s (polymer X1), a 1% 2-ethylhexanol solution of chloroplatinic acid (catalyst 1), a polysiloxane (polymer M1) with the average molecular formula $[H(CH_3)_2SiO_{\frac{1}{2}}]_9(CH_3O_{\frac{1}{2}})_9(SiO_{4/2})_{12}$, (an adhesion promoter of this invention) or vinyltrimethoxysilane (a prior art adhesion promoter) and 3-methyl-1-butyne-3-ol (additive I1). Each composition was then cured at 150° C. while in contact with glass. The adhesion of the cured product to the glass was then measured by loosening one edge of the rubber and ap-

EXAMPLE 2

A series of compositions was prepared from a mixture of a dimethylvinylsiloxy-terminated polydimethylsiloxane with a viscosity of 1 Pa.s (polymer A2), and a polysiloxane (polymer B1) with the average molecular formula $[CH_2=CH(CH_3)_2SiO_{\frac{1}{2}}]_8(SiO_{4/2})_4$ as ingredient (a), and a polysiloxane (polymer M2) with the average molecular formula $[H(CH_3)_2SiO_{\frac{1}{2}}]_8(CH_3O_{\frac{1}{2}})_{14}$ $(SiO_{4/2})_{14}$ as the adhesion promoter. A known adhesion promoter (polymer N1) with the structure

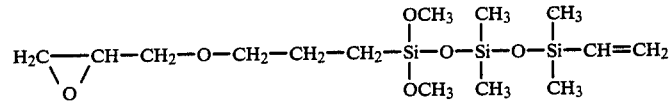

was used as a comparative example. The composition also contained polymer X1, catalyst 1 and additive I1, all of which are described in Example 1. The light transmissions of the compositions was also measured. Each composition was then cured at 120° C. while in contact with glass. The adhesion of the cured product to the glass was evaluated and the results reported in Table 2.

The light transmission was measured using a 10 mm-thick sample at a wavelength of 500 nm.

The comparative example identified as experiment 9 required a relatively long cure time (25 minutes) and transmitted only 80% of the incident light.

TABLE 2

| | Experiment No. | | | |
|---|---|---|---|---|
| | 6 comparison example parts | 7 present invention parts | 8 present invention parts | 9 comparison example parts |
| Ingredients | | | | |
| polymer A2 | 100 | 100 | 100 | 100 |
| polymer B1 | 5 | 5 | 5 | 5 |
| polymer X1 | 8 | 8 | 8 | 8 |
| catalyst 1 | 0.1 | 0.1 | 0.1 | 0.1 |
| additive I1 | 0.01 | 0.01 | 0.01 | 0.01 |
| polymer M2 | — | 2 | 4 | — |
| polymer N1 | — | — | — | 2 |
| light transmission (%) | 98 | 97 | 96 | 80 |
| curing time (120° C., minutes) | 10 | 10 | 9 | 25 |

TABLE 2-continued

|  | Experiment No. | | | |
| --- | --- | --- | --- | --- |
|  | 6 comparison example | 7 present invention | 8 present invention | 9 comparison example |
| Ingredients | parts | parts | parts | parts |
| adhesion (%) | 0 | 95 | 100 | 100 |

EXAMPLE 3

100 Parts polymer A1 of Example 1, 30 parts dry-method silica with a specific surface of 200 m$^2$/g and whose surface had been trimethylsilylated, 0.2 part catalyst 1 and 0.015 part additive I1 of Example 1 were placed in a kneader mixer and blended to produce base 1. The compositions shown in Table 3 were then prepared from base 1, a polysiloxane (polymer X2) with the average component formula [H(CH$_3$)$_2$SiO$_{\frac{1}{2}}$]$_{14}$(SiO$_{4/2}$)$_9$ and other ingredients described in Examples 1 and 2. The resultant compositions were deaired for 3 or 15 minutes under a pressure of 0.26 kPa. The resulting compositions were cured at 100° C. while in contact with aluminum plates. The adhesion of the cured product to the aluminum plate was measured by the H-joint method of Japanese Industry Standard (JIS) A5757.

TABLE 3

|  | Experiment No. | | | |
| --- | --- | --- | --- | --- |
|  | 10 comparison example | 11 present invention | 12 comparison example | 13 comparison example |
| Ingredients | parts | parts | parts | parts |
| base 1 | 100 | 100 | 100 | 100 |
| polymer X2 | 1.2 | 1.2 | 1.2 | 1.2 |
| polymer M1 | — | 2 | — | — |
| polymer N1 | — | — | 2 | — |
| vinyltrimethoxy-silane | — | — | — | 2 |
| curing time (100° C., minutes) | 18 | 18 | 40 | 20 |
| adhesive strength (kg/cm$^2$) | | | | |
| 3 minute degassing | 1.5 | 8 | 9 | 7.5 |
| 15 minute degassing | 2.1 | 15 | 13 | 3.2 |

That which is claimed is:

1. A curable organosiloxane composition comprising
(a) a polyorganosiloxane having an average unit formula R$_a$SiO$_{(4-a)/2}$, where R represents a monovalent hydrocarbon radical, with the proviso that at least two of the R radicals in each molecule are lower alkenyl, and the value of a is from 0.8 to 2.2, inclusive;
(b) a polyorganohydrogensiloxane containing at least 2 silicon-bonded hydrogen atoms per molecule and which is substantially free of silicon-bonded alkoxy groups and alkenyl radicals, the quantity of polyorganohydrogensiloxane being sufficient to provide a molar ratio of silicon-bonded hydrogen atoms in ingredients (b) and (d) to the moles of alkenyl radicals in ingredient (a) of from 0.5:1 to 3.0:1, respectively;
(c) a platinum-containing hydrosilation catalyst in an amount equivalent to from 0.1 to 100 ppm by weight of platinum, based on the combined weight of ingredients (a), (b) and (c);
(d) from about 1 to 20%, based on the weight of ingredient (a), of a polysiloxane represented by the general formula (HR'$_2$SiO$_{\frac{1}{2}}$)$_b$(R"O$_{\frac{1}{2}}$)$_c$(SiO$_{4/2}$)$_d$ where R' and R" represent monovalent hydrocarbon radicals containing from 1 to 3 carbon atoms, the value of b/c in said general formula is from 0.2 to 2, inclusive, the value of b+c)d in said general formula is from 0.4 to 4, inclusive, and d represents a number greater than 0 and less than 30.

2. A composition according to claim 1 where the alkenyl radical present in ingredient (a) is a vinyl radical, at least 75 percent of the R radicals are methyl and the value of a is from 1.95 to 2.05.

3. A composition according to claim 2 where ingredient (a) is a vinyl terminated polydimethylsiloxane exhibiting a viscosity of from 0.05 to 100 Pa.s at 25° C. and the viscosity of ingredient (b) is from 0.001 to 50 Pa.s at 25° C.

4. A composition according to claim 3 where ingredient (b) is a dimethylsiloxane/methylhydrogensiloxane copolymer or a copolymer corresponding to the formula [H(CH$_3$)$_2$SiO$_{\frac{1}{2}}$]$_{14}$(SiO$_{4/2}$)$_9$.

5. A composition according to claim 3 where ingredient (c) is present in an amount equivalent to a platinum content of from 1 to 20 parts per million, based on the combined weight of ingredients (a), (b), and (c).

6. A composition according to claim 3 where R' is methyl, R" is methyl or ethyl, the value of d is from 3 to 20 and the concentration of ingredient (d) is from 1 to 8 parts by weight per 100 parts of ingredient (a).

7. A composition according to claim 6 where ingredient (d) is selected from the group consisting of [H(CH$_3$)$_2$SiO$_{\frac{1}{2}}$]$_9$(CH$_3$O$_{\frac{1}{2}}$)$_9$(SiO$_{4/2}$)$_{12}$, and [H(CH$_3$)$_2$SiO$_{\frac{1}{2}}$]$_8$(CH$_3$O$_{\frac{1}{2}}$)$_{14}$(SiO$_{4/2}$)$_{14}$.

8. A composition according to claim 7 where said composition contains an inhibitor for the curing reaction selected from the group consisting of acetylene compounds, alkenyl group-containing compounds, hydrazines, triazoles, phosphines and mercaptans.

9. A composition according to claim 8 where said inhibitor is 3-methyl-1-butyn-3-ol.

10. A composition according to claim 3 where ingredient (a) includes a polysiloxane corresponding to the formula [CH$_2$=CH(CH$_3$)$_2$SiO$_{\frac{1}{2}}$]$_8$(SiO$_{4/2}$)$_4$.

11. A composition according to claim 3 containing finely divided silica as a filler.

* * * * *